May 3, 1927.
E. P. WATSON
PNEUMATIC BUMPER
Filed Nov. 26, 1926
1,627,472
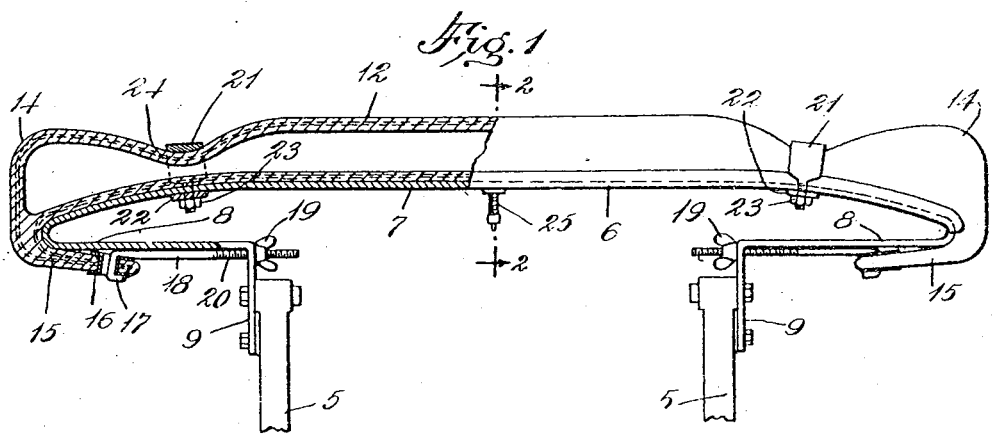
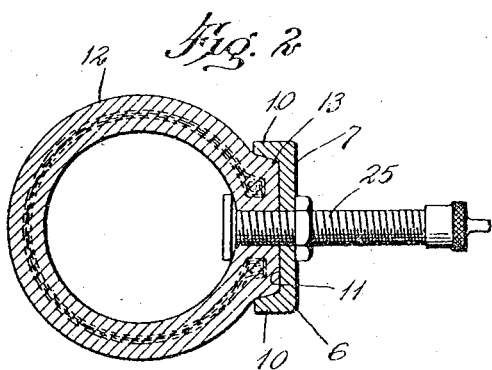
INVENTOR
Edward P. Watson
BY
Howard E. Thompson
ATTORNEY Patented May 3, 1927.

1,627,472

UNITED STATES PATENT OFFICE.

EDWARD P. WATSON, OF FLORAL PARK, NEW YORK.

PNEUMATIC BUMPER.

Application filed November 26, 1926. Serial No. 150,782.

This invention relates to bumpers and particularly to devices of this class for use in connection with motor vehicles; and the object of the invention is to provide a device of this class employing an inflatable body, whereby in the event of accidents, the shock will be taken up through the inflated body or the air cushion formed thereby, thus rendering the device most efficient for the purpose intended; a further object being to provide in conjunction with the pneumatic or air inflated body, means for supporting the same, in the form of a spring bumper, which will give strength and further flexibility to the entire device; a still further object being to provide a bumper which, by virtue of the cushioning body employed, will prevent destruction to other vehicles, especially in the event of slight accidents wherein it has been experienced with the present type of bumpers, that the paint or finish on the body or fenders of the vehicle struck or engaged, has been marred or destroyed; and with these and other objects in view, the invention consists in a device of the class and for the purpose specified, which is simple in construction, efficient in use, and which is constructed as hereinafter described and claimed.

The invention is fully disclosed in the following specification, of which the accompanying drawing forms a part, in which the separate parts of my improvement are designated by suitable reference characters in each of the views, and in which:—

Fig. 1 is a plan view of a bumper made according to my invention with part of the construction broken away and in section; and, Fig. 2 is a section on the line 2—2 of Fig. 1 on an enlarged scale.

In Fig. 1 of the drawing, I have indicated at 5 the front or rear end portion of the chassis or frame of a vehicle in connection with which my improved bumper is mounted. The bumper, in the construction shown, comprises a strong and durable spring body 6 of the usual or any preferred shape commonly employed in spring bumpers now in use, and comprising a front portion 7, loop ends 8 and bracket portions 9. It will be understood, at this time, that any suitable means may be employed for supporting the body 6 in connection with the vehicle frame.

In the construction shown, the front plate 7 of the body 6 is provided on its upper and lower edges with outwardly directed flanges 10, which extend to the ends of the front plate 7 and form a channel 11 in the outer face of said plate, in which an inflatable bumper body 12 is mounted. The body 12 is substantially of a tire or shoe construction, but may be constructed in any desired manner, and may be composed of rubber, rubber compositions, or fibrous materials, the primary difference being that said body is not circular in form but is fashioned to fit in the channel 11 of the front plate 7 of the spring member 6.

The body 12 is preferably circular in cross sectional form except for the enlargement 13 fashioned to fit in the channel 11, as clearly seen in Fig. 2 of the drawing. The ends of said body are closed by rounded end walls 14 which extend beyond the ends of the front plate 7 of the spring member 6, as clearly seen in Fig. 1. At the ends of the body 12 and at the inner sides thereof are projecting tongue portions 15 having eyelets or other reinforcing means 16, in connection with which the hook ends 17 of rods 18 are mounted, said rods being mounted in connection with and passing through the parts 9 of the spring member 6 and adjusted by winged or other nuts 19 mounted on the threaded ends 20 of said rods to firmly support the body 12 in connection with the spring member 6, it being understood that the tongues 15 pass around the looped ends 8 of the member 6 as clearly seen in Fig. 1.

The inflatable body 12 will be constructed in such a manner as to maintain a substantially fixed shape or form when inflated, and also of sufficient strength and rigidity to withstand the average impact in the event of collisions. To aid in maintaining the body 12 in position, it is preferred that U-shaped keepers 21 be employed adjacent the end portions of said body, the ends of said keepers being threaded and adapted to pass through plates 22 on the inner face of the front plate 7 of the member 6, and retained in position by nuts 23. The U-shaped keepers 21 are adapted to kink the body 12 inwardly as seen at 24 in order that the outer faces of said keepers will be within the boundary of the outer face of the body 12, in order that said body will take up directly, all shocks to which the bumper may be subjected.

An inflating nozzle 25 is mounted centrally of the body 12 and the front plate 7 of the member 6, and extends backwardly through said front plate as clearly seen. By means of this nozzle, the body 12 may be inflated and maintained in inflated condition at all times in the same manner as the inflation of tires of motor vehicles.

The assemblage of the parts will be apparent from the structure shown and described, it being understood that the body 12 is mounted in the channel 11 of the member 6, and the tongues 15 are passed around the looped ends 8 and engage the rods 18 which are tightened up by the nuts 19 to securely retain the body 12 in position. The keepers 21 are mounted in position before the body 12 is inflated, and if desired, the body 12 may be constructed or shaped to suit the use of said keepers.

It is a well known fact that in the use of metallic spring bumpers as are in common use, it is experienced that the bumper of one vehicle will strike a part of another vehicle in slight accidents, sometimes in passing a vehicle, or in trying to curb a vehicle in parking, and in leaving a congested parking area, which results in slight denting, scratching or otherwise marring of such vehicle. It is one of the distinctive features of my invention to overcome this difficulty, in the provision of a free, cushioned and non-metallic body on the face of the bumper, which in the event of such accidents, would not appreciably mar or destroy a vehicle. The outstanding feature of my improved bumper, however, is that in the impact, the direct shock is taken up by and through the inflated body 12 which would cause a rebound to the progressing vehicle to some appreciable degree, and would be very beneficial, especially in slight impacts, which with the present type of bumper construction, have caused damage to vehicles; while my present bumper construction would avoid such damage, or at least reduce the same to an appreciable degree.

It will be understood that my invention may be employed in bumpers mounted at the front or rear of a vehicle, and may be employed in connection with bumpers or bumperettes of any shape, form, style or construction, and not necessarily restricted to bumpers extending entirely across the vehicle; and various changes in and modifications of the construction herein shown and described, may be made within the scope of the appended claims without departing from the spirit of my invention, or sacrificing its advantages.

Having fully described my invention, what I claim as new and desire to secure by Letters Patent, is:—

1. The combination with a spring bumper, of an inflatable body mounted upon the outer face of said bumper, said body being of greater width and length than the front plate of said bumper, means for retaining said body against displacement from said bumper, said means including keepers, and adjustable members coupled with the ends of said body.

2. The combination with a spring bumper, of an inflatable body mounted upon the outer face of said bumper, said body being of greater width and length than the front plate of said bumper, means for retaining said body against displacement from said bumper, said means including keepers, adjustable members coupled with the ends of said body, and the inflation valve of said body extending through said bumper.

3. In a bumper of the class described, a bumper member having looped ends, the outer face of the front plate of said member being channeled to receive and support a body of resilient, nonmetallic material in connection therewith.

4. In a bumper of the class described, a bumper member, the outer face of the front plate of said member being channeled to receive and support a body of resilient, nonmetallic material in connection therewith, and means detachably and adjustably coupled with said bumper for retaining said body against displacement therefrom.

5. In a bumper of the class described, a bumper member, the outer face of the front plate of said member being channeled to receive and support a body of resilient, nonmetallic material in connection therewith, means detachably and adjustably coupled with said bumper for retaining said body against displacement therefrom, and keepers mounted on the front plate of the bumper and engaging said body to retain the same against displacement.

6. In a bumper of the class described, a bumper member, the outer face of the front plate of said member being channeled to receive and support a body of resilient, nonmetallic material in connection therewith, means detachably and adjustably coupled with said bumper for retaining said body against displacement therefrom, keepers mounted on the front plate of the bumper and engaging said body to retain the same against displacement, and said body being depressed where the keepers cooperate therewith to position the keepers within the boundaries of the outer face of said body.

7. The combination with a spring bumper, of an inflatable body mounted upon the outer face of said bumper, said body being of greater width and length than the front plate of the bumper, and means involving adjustable members coupled with the ends of said body for retaining the same against displacement from said bumper.

8. The combination with a spring bumper, of an inflatable body mounted upon the outer face of said bumper, said body being of greater width and length than the front plate of said bumper, means for retaining said body against displacement from said bumper, said means involving keepers, and said body having indentures where the keepers cooperate therewith to prevent shifting of said body and to retain the keepers within the outer face of said body.

9. A bumper body of the class described comprising an elongated tube, the ends of which are closed to form a sealed air chamber therein, an inflation valve for passing air into and out of said chamber, and the ends of the tube being provided with flat tongue portions by means of which the tube may be retained in connection with a suitable support.

10. A bumper body of the class described comprising an elongated tube, the ends of which are closed to form a sealed air chamber therein, an inflation valve for passing air into and out of said chamber, the ends of the tube being provided with flat tongue portions by means of which the tube may be retained in connection with a suitable support, said tongue portions extending inwardly in substantially parallel relation to the tube, and the end portions being provided with eyelets.

In testimony that I claim the foregoing as my invention I have signed my name this 22nd day of November, 1926.

EDWARD P. WATSON.